(12) United States Patent
Sonwane et al.

(10) Patent No.: US 11,029,970 B2
(45) Date of Patent: Jun. 8, 2021

(54) OPERATING SYSTEM EXTENSION FRAMEWORK

(71) Applicant: SAP SE, Walldorf (DE)

(72) Inventors: Tejram Jagannath Sonwane, Bangalore (IN); Dharmesh Rana, Bangalore (IN); Rikesh Subedi, Hetauda (NP)

(73) Assignee: SAP SE, Walldorf (DE)

( * ) Notice: Subject to any disclaimer, the term of this patent is extended or adjusted under 35 U.S.C. 154(b) by 191 days.

(21) Appl. No.: 16/169,880

(22) Filed: Oct. 24, 2018

(65) Prior Publication Data

US 2020/0133687 A1 Apr. 30, 2020

(51) Int. Cl.
*G06F 9/445* (2018.01)
*G06F 16/17* (2019.01)
*G06F 16/11* (2019.01)
*G06F 9/54* (2006.01)

(52) U.S. Cl.
CPC ...... *G06F 9/44505* (2013.01); *G06F 9/44526* (2013.01); *G06F 9/541* (2013.01); *G06F 16/122* (2019.01); *G06F 16/1734* (2019.01)

(58) Field of Classification Search
None
See application file for complete search history.

(56) References Cited

U.S. PATENT DOCUMENTS

| | | | | |
|---|---|---|---|---|
| 8,220,007 | B1 * | 7/2012 | Yeh | G06F 8/65 |
| | | | | 719/328 |
| 8,667,514 | B2 * | 3/2014 | Rastogi | G06F 9/44505 |
| | | | | 719/328 |
| 9,009,739 | B2 * | 4/2015 | Labour | G06F 9/44526 |
| | | | | 719/328 |
| 9,223,594 | B2 * | 12/2015 | Brown | G06F 9/44526 |
| 9,250,926 | B2 * | 2/2016 | Allyn | G06F 9/44526 |
| 9,262,187 | B2 * | 2/2016 | Sheehan | G06F 9/44521 |
| 9,684,547 | B2 * | 6/2017 | Krstic | G06F 21/53 |
| 9,811,393 | B2 * | 11/2017 | Kiehtreiber | G06F 9/54 |
| 10,061,601 | B2 * | 8/2018 | Marathe | G06F 9/54 |
| 10,503,564 | B2 * | 12/2019 | Krsti | G06F 9/541 |
| 10,943,008 | B2 * | 3/2021 | Vinogradov | G06F 21/566 |
| 2007/0011332 | A1 * | 1/2007 | Raghavan | G06F 8/656 |
| | | | | 709/226 |

(Continued)

*Primary Examiner* — Umut Onat
(74) *Attorney, Agent, or Firm* — Erise IP, P.A.

(57) ABSTRACT

Systems, method, and computer programmable products are described herein for generating application extension frameworks for operating systems. A host application receives data encapsulating a modification to an extension configuration file that defines one or more extensions for use by the host application. The host application includes a plurality of binary files. The host application provides the modified extension configuration file to an extension framework for instantiation of a first extension of the one or more extensions. The extension framework generates an interface for the first extension for communication with the extension framework. A new application encompassing the extension framework, the first extension, and the host application is generated without modification to the plurality of binary files of the host application. The first extension communicates with the extension framework via the interface.

20 Claims, 5 Drawing Sheets

(56) References Cited

U.S. PATENT DOCUMENTS

| | | | |
|---|---|---|---|
| 2010/0122313 A1* | 5/2010 | Ivgi | G06F 21/6218 |
| | | | 726/1 |
| 2012/0159423 A1* | 6/2012 | Becker | G06F 9/44526 |
| | | | 717/102 |
| 2012/0331488 A1* | 12/2012 | Marathe | G06F 9/54 |
| | | | 719/331 |
| 2015/0095590 A1* | 4/2015 | Lu | G06F 9/4552 |
| | | | 711/146 |
| 2017/0302458 A1* | 10/2017 | Berger | H04L 63/0428 |
| 2020/0019410 A1* | 1/2020 | Dima | G06F 9/448 |

* cited by examiner

OPERATING SYSTEM EXTENSION FRAMEWORK

TECHNICAL FIELD

The subject matter described herein relates to extension frameworks for operating systems.

BACKGROUND

Software applications, such as mobile phone applications, are categorized into consumer applications and enterprise applications. Consumer applications are directly connected to the general public such as applications used to book a taxi, flight, and/or hotel. Enterprise applications are used to assist organizations in solving the enterprise problems. Enterprise applications developed by the enterprise software companies can be used by the corporate customers. Enterprise application users may tailor enterprise applications in accordance with varying features needed from a business perspective such as adding customized security features to the application or customizing branding within the application. Such customization, however, may not be compatible with some operating systems which can prevent binary code modification to developed applications.

SUMMARY

In one variation a method generating a new application includes receiving, by a host application, data encapsulating a modification to an extension configuration file that defines one or more extensions for use by the host application. The host application includes a plurality of binary files. The host application provides the modified extension configuration file to an extension framework for instantiation of a first extension of the one or more extensions. The extension framework generates an interface for the first extension for communication with the extension framework. A new application encompassing the extension framework, the first extension, and the host application is generated without modification to the plurality of binary files of the host application. The first extension communicates with the extension framework via the interface.

In some variations, executing the new application can incorporate the first extension. The new application can interface with an operating system and the first extension can remain transparent to or undetectable by the operating system.

In other variations, the modification to the extension configuration file can include adding of an external extension not previously defined by the extension configuration file. The external extension can be the first extension.

In some variations, the external extension can include a file manager or a file logger. The software developers kit can include the host application and the extension framework. The extension framework can be a middleware layer between the host application and the first extension. The one or more extensions can include a second extension and instantiation of the second extension is dependent upon instantiation of the first extension. The interface can be stored within the first extension and can be generated to comply with an interface protocol defined by the extension framework.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, using the subject matter described herein, a developer can rebuild an application to add, delete, and/or modify features of an existing host application without modifying binary files of that existing host application. The rebuilt application can remain undetectable to an operating system which may not permit modification to such binary files.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Enterprise applications can incorporate a built-in set of extensions. Some operating systems may prohibit the modification of binary files of these enterprise applications. Use of an extension framework can facilitate enhancement and/or modification an application without modifying the binary files of the application itself. The extension framework can be used to interface between an external extension and the host application. The external extension can be, for example, an extension that is not within the built-in extensions of an enterprise application, such that the external extension substitutes in for one or more built-in extensions of the enterprise application. The external extension can provide customizable features such as branding or analysis not offered by the built-in extensions.

Figure 1:
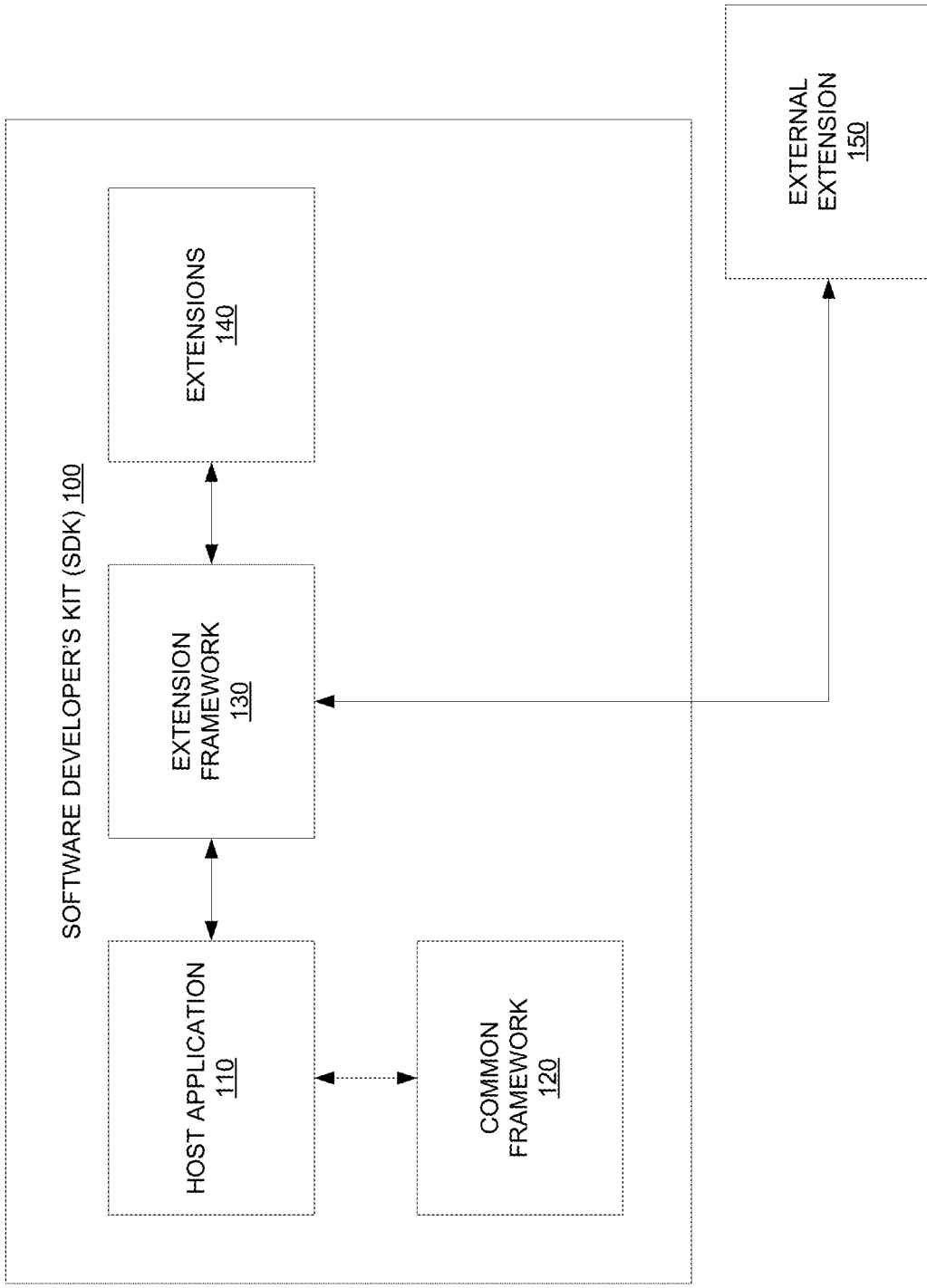
FIG. 1 illustrates a block diagram of an example software developer's kit.

FIG. 1 illustrates a block diagram of an example software developer's kit (SDK) 100. SDK 100 includes a host application 110, a common framework 120, an extension framework 130, and one or more extensions 140. Host application 110 can define an extension configuration file of one or more extensions 140 with which it can interface. Host application 110 can communicate with extension framework 130 to instantiate one or more extensions 140. Common framework 120 can define various interfaces used by host application 110. Extension framework 130 can facilitate fetching of one or more extensions 140 for use with host application 110. There may be some circumstances under which an enterprise or developer may want to customize the features of one or more extensions 140 such as providing different capabilities or branding options. Such customization may not be able to be performed on the one or more extensions 140 due to operating system restrictions (e.g., an operating system may prevent modification of binary files associated with one or more extensions 140 or the host application 110). In this case, an external extension 150 can be incorporated such that the extensions framework 130 can route traffic to the external extension 150 rather than to the one or more extensions 140, as described in more detail in FIG. 2. Such routing can be transparent to the operating system running host application 110. Using the extension framework 130, external extension 150 can be incorporated to operate with host application 110, and a new application can be generated which encompasses the external extension 150 and the host application 110. This new application facilitates the bypass of one or more built-in extensions 140 without having to modify any binary files associated with such extensions 140 or host application 110.

Figure 2:
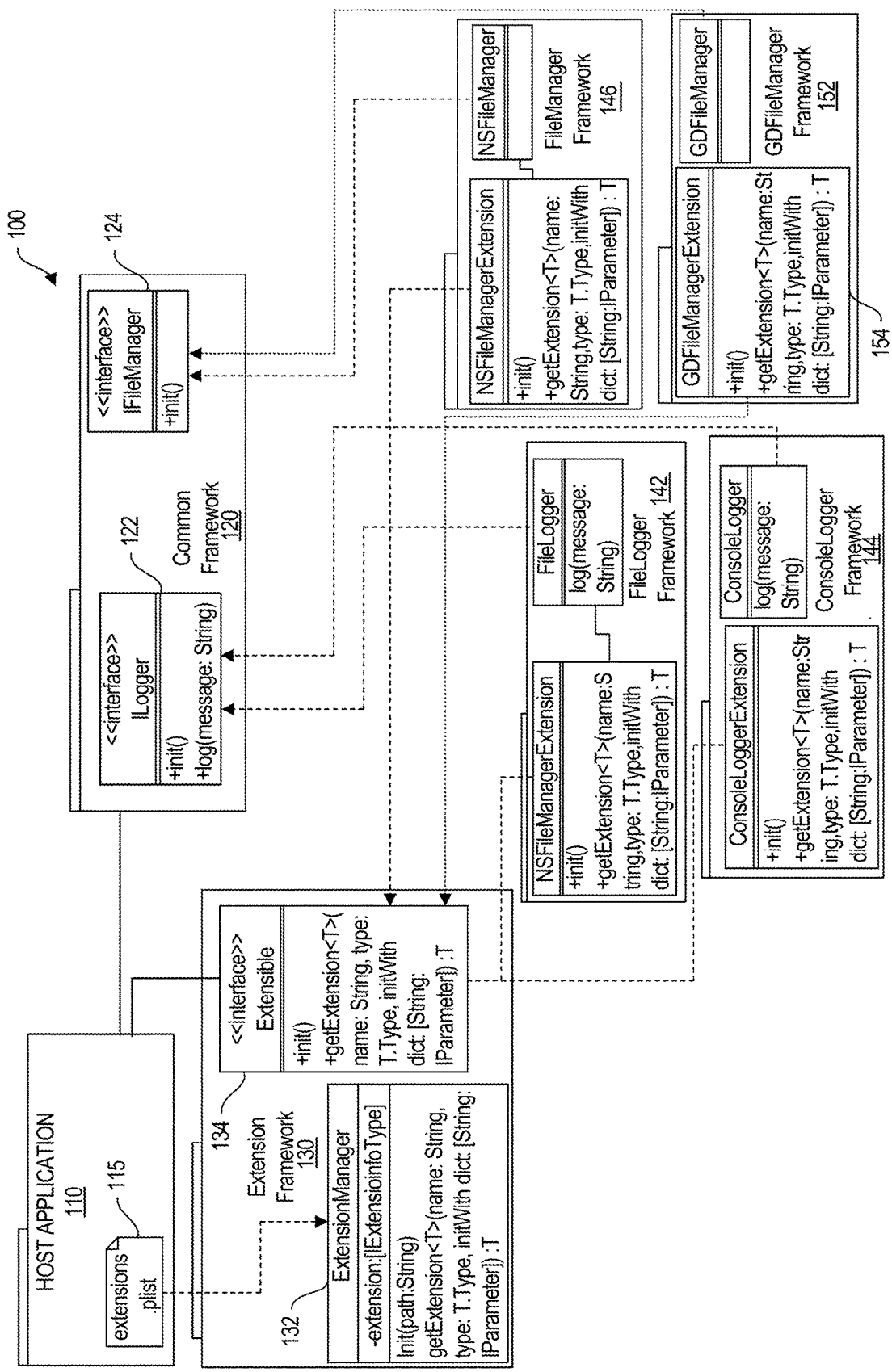
FIG. 2 illustrates a block diagram of an example software architecture of an example SDK.

FIG. 2 illustrates a block diagram of an example software architecture of SDK 100. Host application 110 can include an extension configuration file 115 (e.g., "extension.plist"). Extension configuration file 115 can include a listing of the one or more built-in extensions 140 which can be used with host application 110. Each extension listed within extension configuration file 115 can include, for example, a name, a protocol name, and/or a default implementation name. Host application 110 can call an extension (e.g., one of the extensions 140 or external extension 150) by providing its name. The protocol name is a protocol or interface name which can be implemented by other frameworks such as common framework 120 or extension framework 130. Each extension 140 may have one or more implementations. An implementation element can contain the details of the frameworks which has the implementation of the protocol or interface name. The implementation element can contain the framework name and/or a class name from a framework which contains the implementation of a defined protocol interface 134 (e.g., Extensible) from the extension framework 130. When the extension framework 130 has an implementation of a defined protocol interface 134, then, it is considered to be the compliant for an extension 130. Each implementation framework may require some input (e.g., a passed argument element). Each passed argument element can contain the name of the argument and an argument type.

Extension framework 130 can include an extension manager 132 and a defined protocol interface 134 (e.g., Extensible). Using the argument element and the argument type, extension manager 132 can check the type of argument passed from the host application 130. Defined protocol interface 134 can be conformed and/or implemented by each extension 140. Host application 100 can invoke an extension manager 132 of extension framework 130. Host application 110 can provide the extension configuration file 115 to extension manager 132. Whenever host application 110 needs any extension 140, it can invoke that extension through extension manager 132. Host application 110 can provide details about the protocols and their implementations through extension configuration file. Extension manager 132 can invoke the extension 140 and provide an object of implementation to the host application 110. Extension manager 132 can also validate types of the implementations and/or maintain a listing of dependencies between extensions 140. If an extension is dependent one or more other extensions 140 or external extension 150, extension manager 132 can validate if depended upon extensions are already placed in a dependency container, as discussed in more detail in FIG. 3.

Common framework 120 stores defined interfaces for each of the extensions 140. These interfaces can be utilized for a number of different host applications 110. FIG. 2 illustrates two example interfaces iLogger protocol 122 and iFileManager protocol 124. In this example, iLogger protocol 122 is a defined protocol for a logger functionality used by host application 110. IFileManager protocol 124 is used for various input and/or output related functionalities associated with host application 110. ILogger protocol 122 and iFileManager protocol 124 are example interfaces that can defined and/or created by a developer of host application 110. Extension framework 130 is independent of the interfaces within common framework 120.

As illustrated in FIG. 2, host application 110 can communicate with one or more extensions 140 (e.g., FileLogger Framework 142, FileManager Framework 146). In some cases, there can be a one to one correlation between a protocol of the common framework 120 and an implementation of an extension 130. For example, implementation of the FileManager Framework 146 can utilize the iFileManager protocol 124. In other cases, a single protocol can have multiple implementations of an extension 140. For example, FileLogger Framework 142 and ConsoleLogger Framework 144 can be implemented using a single protocol, iLogger protocol 122. In order to have the one or more extensions 140 communicate with 110 via extension framework 130, the one or more extensions 140 must conform to the defined protocol interface 134 of extension framework 130.

When host application 110 requires a particular type of extension 130 (e.g., a file manager or a file logger), host application 110 communicates with extension framework 130. The extension framework 130 checks to see which file manager is registered with it as articulated within extension configuration file 115. For a file manager that is within extension configuration file 115, extension manager 132 creates an instance of that particular file manager and provides it to the host application 110.

Extension configuration file 115 can be a forward facing file, editable, for example, by a developer. When a host application 110 is developed, the listing of extensions within extension configuration file 115 can be a specific set of extensions (e.g., extensions 140) permitted to interface with host application 110.

Using the extension configuration file 115, a developer can customize host application by defining an external extension 150 the host application should use in lieu of its built-in extensions 140. For example, a developer may want to incorporate a different file manager solution (e.g., an external extension 150) such as a Good Dynamics (GD) FileManager Framework 152. In order to incorporate GDFileManager Framework 152, the libraries can be wrapped to conform with the iFileManager protocol 124 and defined protocol interface 134 (e.g., GDFileManagerExtension 154). The extension configuration file 115 can be modified to create an entry for GDFileManagerExtension 154. In this example, a new application can be generated which incorporates the GDFileManager Framework 152 (e.g., an external extension 150) in place of FileManagerFramework 146 (e.g., a built-in extension 140) without modifying any binary files of the host application 110 or extensions 140. As the binary files are not modified, use the external extension 150 can be transparent to or undetectable by an operating system.

Figure 3:
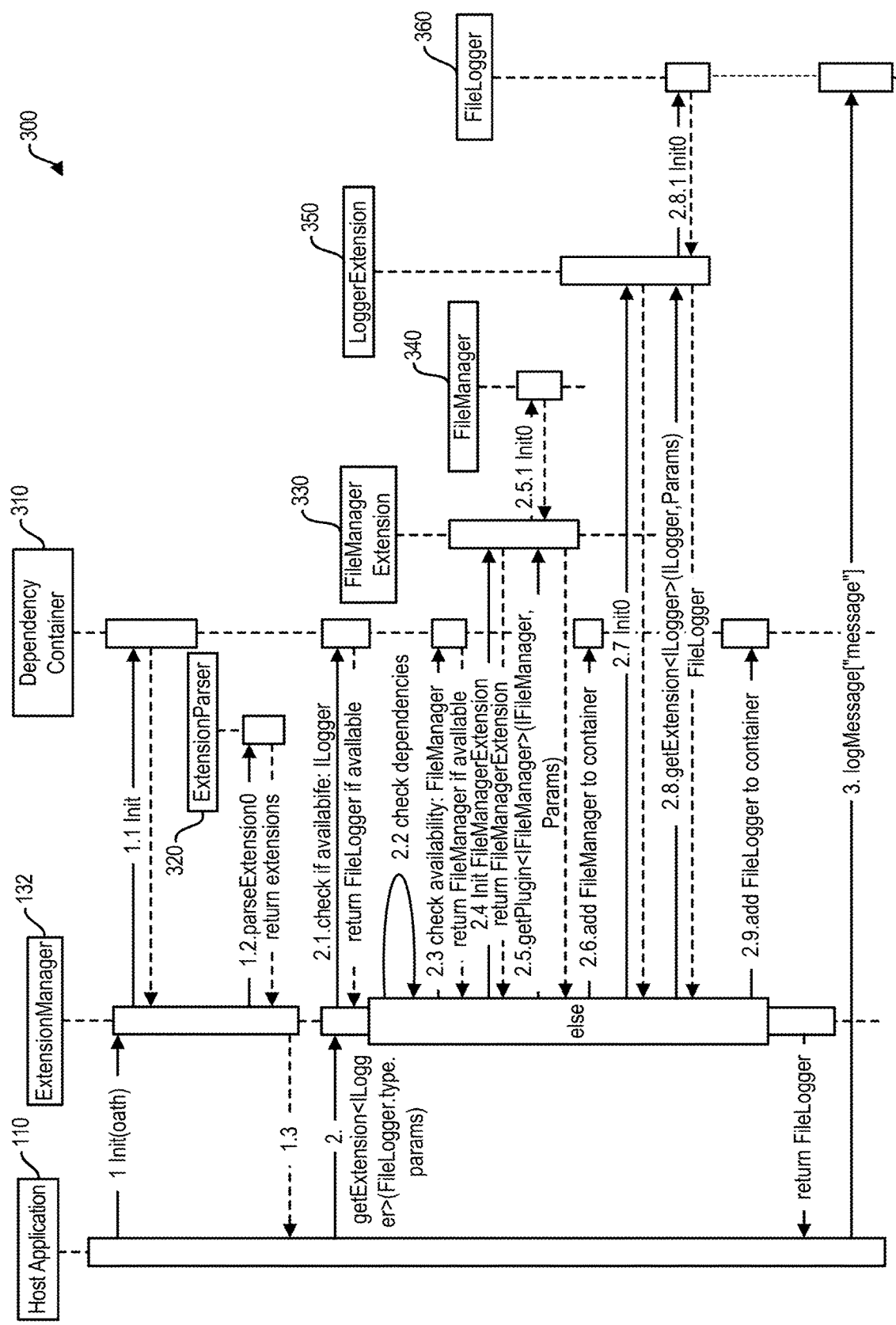
FIG. 3 illustrates a workflow diagram for incorporating an external extension with a host application.

FIG. 3 illustrates a workflow diagram 300 for incorporating an external extension 150 in an host application 110 build. Host application 110 instantiates, at 1, the extension manager 132. Host application 110 passes the file path of extension configuration file 115 as a input parameter to extension manager 132. Extension manager 132 instantiates, at 1.1, a dependency container 310. Dependency container 310 contains the extension and/or services which are invoked by the extension manager 132. Extension manager 132 parses, at 1.2, the information of the extension configuration file 115. After parsing the extension configuration file 115, extension manager 132 is ready to invoke one or more extensions 140 or an external extension 150. An object of these extensions 140, 150 is returned, at 1.3, by extension manager 132 to the host application 110. In this example, host application 110 needs to create an extension of FileLogger 360. It invokes, at 2, a function (e.g., "getExtension") via extension manager 132. Extension manager 132 passes, at 2.1, the extension name as an input parameter to dependency container 310. Host application may request either a default implementation of FileLogger 360 (e.g., a built-in extension 140 such as FileLogger Framework 142) or it can ask for a specific implementation of FileLogger 360 (e.g., an external extension 150) from extension manager 132. Extension manager 132 checks, at 2.1, if the requested FileLogger 360 extension is available in the dependency container 310. If the requested FileLogger 360 is already available in dependency container 310, then extension manger 132 sends back the FileLogger 360 to the host application 110. If the FileLogger 360 extension is not available in dependency container 310, then extension manger 132 creates a instantiation of the FileLogger 360.

An instantiation of the FileLogger 360 can be created, by extension manager 132 checking, at 2.2, for the dependencies to create the extension. In this example, FileLogger 360 is dependent on FileManager 340. Extension manager 132 checks availability, at 2.3, of FileManager 340 in dependency container 310. If FileManager 340 is available, then dependency container 310 returns the FileManager 340 extension to extension manager 132. If FileManager 340 is not available in the dependency container 310, then extension manager 132 has to instantiate new FileManager 340. A new FileManager 340 can be instantiated by extension manager 132 checking if host application 110 uses the default file manager (e.g., built-in extension 140 such as FileManager Framework 146) or an external file manager (e.g., external extension 150 such as GDFileManager Framework 152) as defined by the extension configuration file 115. Extension manager 132 invokes the file manager extension by sending, at 2.4, an instantiate FileManagerExtension request to FileManagerExtension 330 using the class name of file manager extension defined within the extension configuration file 115. Extension manager 132 creates an object of file manager extension using a reflection method (e.g., by instantiating the object from class name) conforming to the defined protocol interface 134. Once a file manager extension object is created, extension manager 132 invokes, at 2.5, a getExtension method to create object of FileManager 340. This method can require a dictionary for input parameters where the parameter name is a key and parameter value is a value. The getExtension method of file manager extension 330 can read a dictionary and create a file manager object (e.g., FileManager 340) by passing all input parameters, at 2.5.1. One the file manager object is created, manager adds, at 2.6, the file manager object (e.g., FileManager 340) to the dependency container 310. The dependency container 310 checks if this object is available. If the object is not available, the file manager object (e.g., FileManager 340) is stored inside the dependency container 310.

Once all dependencies are prepared to create a FileLogger 360, then extension manager 132 invokes the file logger extension, at 2.7. Once the LoggerExtension 350 is created, at 2.8, then extension manager invokes the getExtension method of file logger extension to get the object of file logger. Extension manager 132 passes the dictionary containing the file manager object which is required to instantiate the file logger object (e.g. FileLogger 360). The file logger object is stored, at 2.9, in the dependency container 310. The created file logger object is then returned by the extension manager 132 to host application 110. Host application can then use the file logger object (e.g., FileLogger 360) for logging purposes, at 3.

Figure 4:
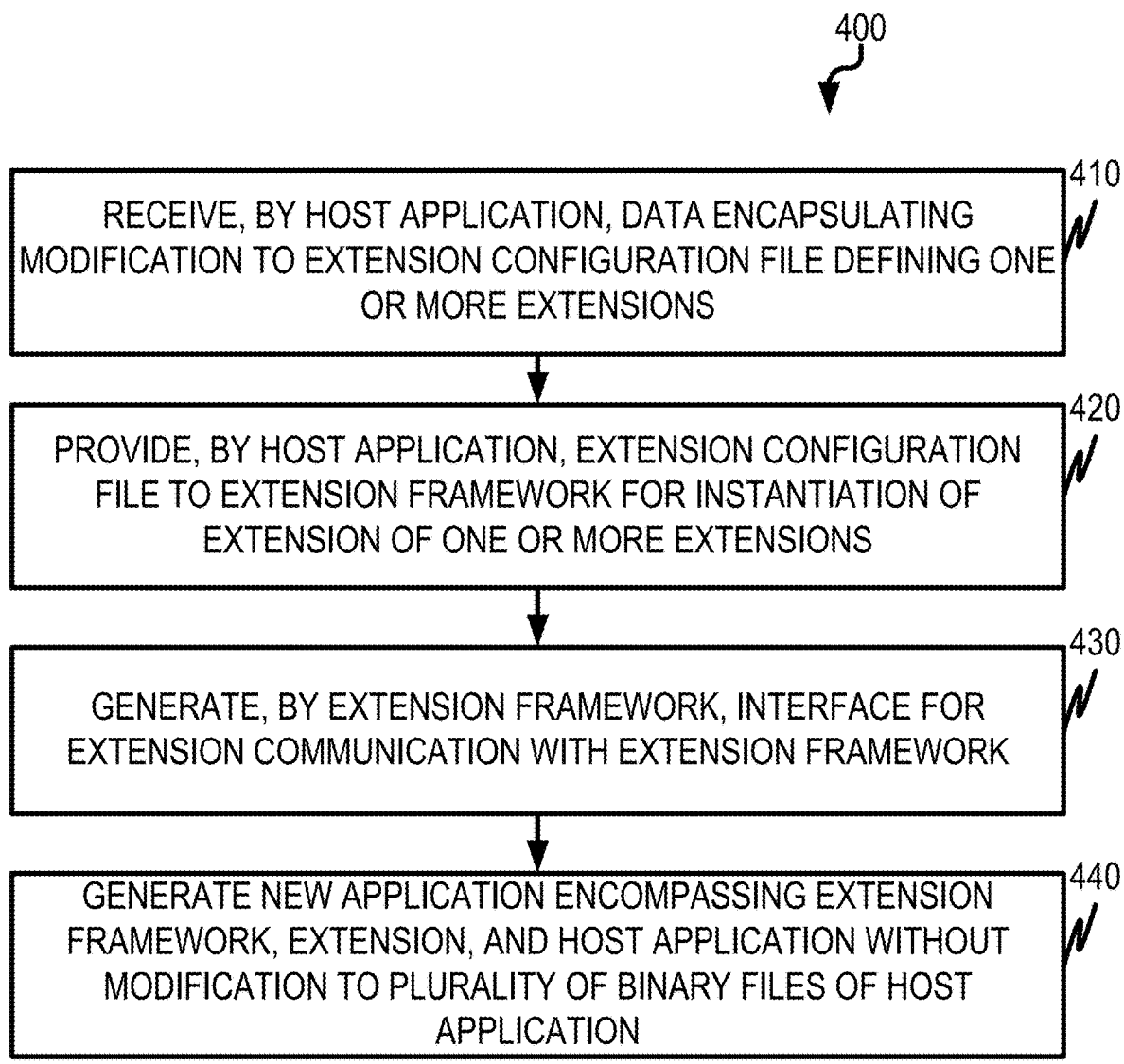
FIG. 4 is a process flow diagram illustrating the generation of a new application which incorporates an external extension.

FIG. 4 is a process flow diagram 400 illustrating the generation of a new application which incorporates an external extension 150. Host application 110 receives, at 410, a modification to an extension configuration file 115 defining one or more extensions 140. Host application 110 includes a plurality of binary files. The modification includes an addition of an external extension 150 not previously incorporated within extensions 140. The extension configuration file 115 is provided, at 420, by the host application 110 to the extension framework 130 for instantiation of the extension (e.g., external extension 150) within extension configuration file 115. An interface (e.g., GDFileManagerExtension 154) for the external extension 150 can be generated which correlates to a defined protocol interface 134 of the extension framework 130. A new application can be generated, at 440, encompassing the extension framework 130, the external extension 150, and the host application 110 without modification to the plurality of binary files of the host application 110.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random access memory associated with one or more physical processor cores.

Figure 5:
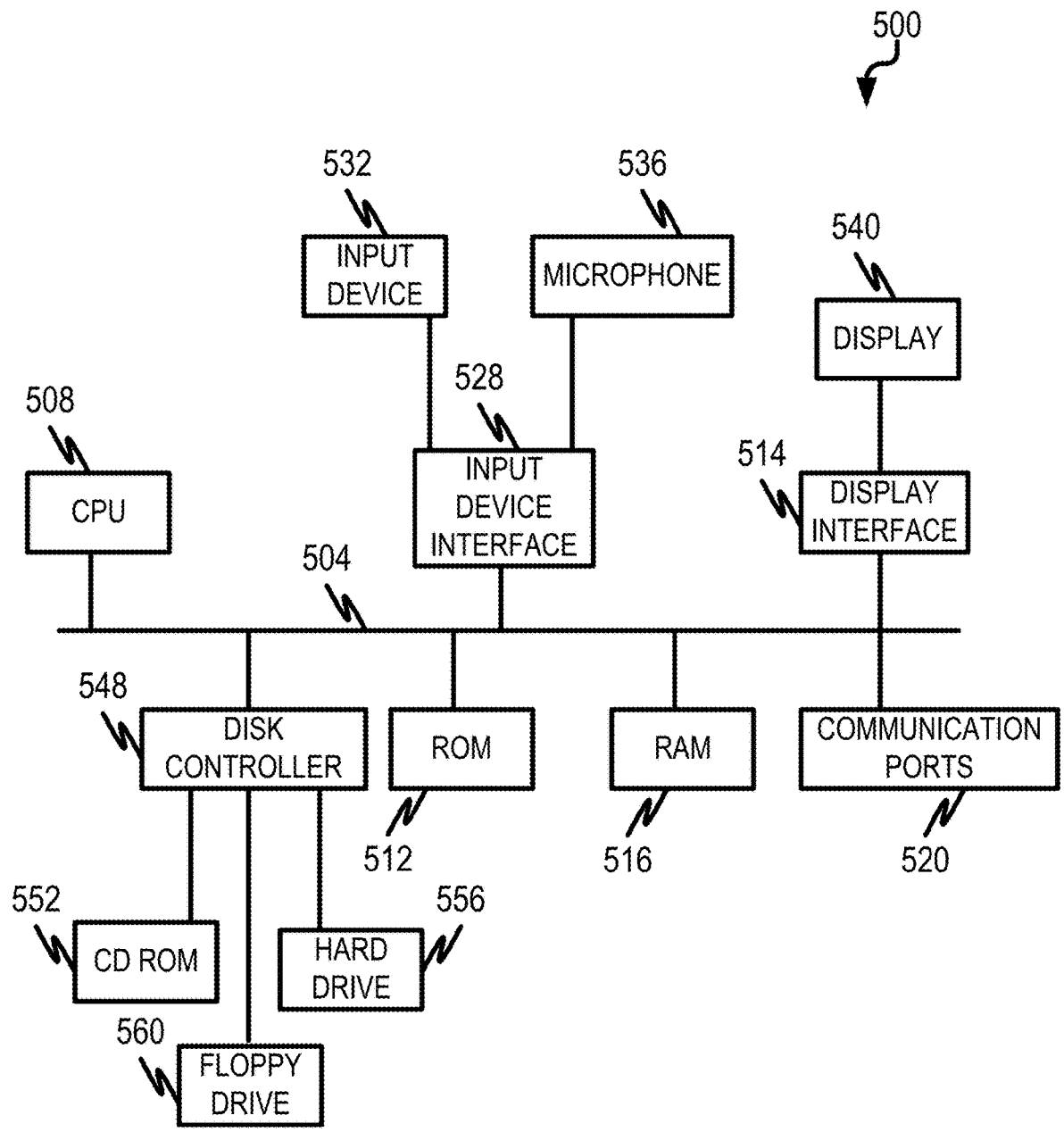
FIG. 5 is a diagram illustrating a sample computing device architecture for implementing various aspects described herein.

FIG. 5 is a diagram 500 illustrating a sample computing device architecture for implementing various aspects described herein. A bus 504 can serve as the information highway interconnecting the other illustrated components of the hardware. A processing system 508 labeled CPU (central processing unit) (e.g., one or more computer processors/data processors at a given computer or at multiple computers), can perform calculations and logic operations required to execute a program. A non-transitory processor-readable storage medium, such as read only memory (ROM) 512 and random access memory (RAM) 516, can be in communication with the processing system 508 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 548 can interface one or more optional disk drives to the system bus 504. These disk drives can be external or internal floppy disk drives such as 560, external or internal CD-ROM, CD-R, CD-RW or DVD, or solid state drives such as 552, or external or internal hard drives 556. As indicated previously, these various disk drives 552, 556, 560 and disk controllers are optional devices. The system bus 504 can also include at least one communication port 520 to allow for communication with external devices either physically connected to the computing system or available externally through a wired or wireless network. In some cases, the communication port 520 includes or otherwise comprises a network interface.

To provide for interaction with a user, the subject matter described herein can be implemented on a computing device having a display device 540 (e.g., a CRT (cathode ray tube) or LCD (liquid crystal display) monitor) for displaying information obtained from the bus 504 to the user and an input device 532 such as keyboard and/or a pointing device (e.g., a mouse or a trackball) and/or a touchscreen by which the user can provide input to the computer. Other kinds of input devices 532 can be used to provide for interaction with a user as well; for example, feedback provided to the user can be any form of sensory feedback (e.g., visual feedback, auditory feedback by way of a microphone 536, or tactile feedback); and input from the user can be received in any form, including acoustic, speech, or tactile input. In the input device 532 and the microphone 536 can be coupled to and convey information via the bus 504 by way of an input device interface 528. Other computing devices, such as dedicated servers, can omit one or more of the display 540 and display interface 514, the input device 532, the microphone 536, and input device interface 528.

To provide for interaction with a user, the subject matter described herein can be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more data processors forming one or more computing devices, the method comprising:

receiving, by a host application, data encapsulating a modification to an extension configuration file that defines one or more extensions for use by the host application, wherein the host application comprises a plurality of binary files;

providing, by the host application, the modified extension configuration file to an extension framework for instantiation of a first extension of the one or more extensions;

generating, by the extension framework, an interface for the first extension for communication with the extension framework; and building and generating, by the extension framework, a new application encompassing the extension framework, the first extension, and the host application without modification to the plurality of binary files of the host application, wherein the first extension communicates with the extension framework via the interface;

wherein the new application interfaces with an operating system that prevent modification of binary files associated with the one or more extensions and the first extension remains undetectable by the operating system.

2. The method of claim 1, further comprising executing the new application which incorporates the first extension.

3. The method of claim 1, wherein the modification to the extension configuration file comprises adding of an external extension not previously defined by the extension configuration file, wherein the external extension is the first extension.

4. The method of claim 3, wherein the external extension comprises a file manager or a file logger.

5. The method of claim 1, wherein a software developers kit comprises the host application and the extension framework.

6. The method of claim 1, wherein the extension framework is a middleware layer between the host application and the first extension.

7. The method of claim 1, further comprising determining, by the extension framework, whether any one of the one or more extensions are dependent upon another one of the one or more extensions wherein the one or more extensions includes a second extension and instantiation of the second extension is dependent upon instantiation of the first extension.

8. The method of claim 1, wherein the interface is stored within the first extension and is generated to comply with an interface protocol defined by the extension framework.

9. A system comprising:
at least one data processor; and
memory storing instructions, which when executed by at least one data processor, result in operations comprising:
  receiving, by a host application, data encapsulating a modification to an extension configuration file that defines one or more extensions for use by the host application, wherein the host application comprises a plurality of binary files;
  providing, by the host application, the modified extension configuration file to an extension framework for instantiation of a first extension of the one or more extensions;
  generating, by the extension framework, an interface for the first extension for communication with the extension framework; and
  building and generating, by the extension framework, a new application encompassing the extension framework, the first extension, and the host application without modification to the plurality of binary files of the host application, wherein the first extension communicates with the extension framework via the interface;
  wherein the new application interfaces with an operating system that prevent modification of binary files associated with the one or more extensions and the first extension remains undetectable by the operating system.

10. The system of claim 9, wherein the operations further comprise executing the new application which incorporates the first extension.

11. The system of claim 9, wherein the modification to the extension configuration file comprises adding of an external extension not previously defined by the extension configuration file, wherein the external extension is the first extension.

12. The system of claim 11, wherein the external extension comprises a file manager or a file logger.

13. The system of claim 9, wherein a software developers kit comprises the host application and the extension framework.

14. The system of claim 9, wherein the extension framework is a middleware layer between the host application and the first extension.

15. The system of claim 9, wherein the one or more extensions includes a second extension and instantiation of the second extension is dependent upon instantiation of the first extension.

16. The system of claim 9, wherein the interface is stored within the first extension and is generated to comply with an interface protocol defined by the extension framework.

17. A non-transitory computer programmable product storing instructions which, when executed by at least one data processor forming part of at least one computing device, implement operations comprising:
  receiving, by a host application, data encapsulating a modification to an extension configuration file that defines one or more extensions for use by the host application, wherein the host application comprises a plurality of binary files;
  providing, by the host application, the modified extension configuration file to an extension framework for instantiation of a first extension of the one or more extensions;
  generating, by the extension framework, an interface for the first extension for communication with the extension framework; and
  building and generating, by the extension framework, a new application encompassing the extension framework, the first extension, and the host application without modification to the plurality of binary files of the host application, wherein the first extension communicates with the extension framework via the interface;
  wherein the new application interfaces with an operating system that prevent modification of binary files associated with the one or more extensions and the first extension remains undetectable by the operating system.

18. The non-transitory computer programmable product of claim 17, wherein the operations further comprising executing the new application which incorporates the first extension.

19. The non-transitory computer programmable product of claim 17, wherein the external extension comprises a file manager or a file logger.

20. The non-transitory computer programmable product of claim 17, wherein a software developers kit comprises the host application and the extension framework and the extension framework is a middleware layer between the host application and the first extension.

* * * * *